United States Patent Office 3,446,887
Patented May 27, 1969

---

3,446,887
METHOD OF PRODUCING FOOTWEAR
Herbert Ludwig, Usen via Bremen, Germany; Friedrich Koch & Hans Loewe, joint executors of said Herbert Ludwig, deceased, assignors to Desma-Werke Gesellschaft mit beschrankter Haftung, Usen via Bremen, Germany, a firm
Filed Apr. 30, 1964, Ser. No. 363,965
Claims priority, application Germany, Apr. 30, 1963,
D 41,458
Int. Cl. B29d *3/02;* B29k *5/12*
U.S. Cl. 264—244            7 Claims

---

ABSTRACT OF THE DISCLOSURE

This invention provides a method of producing footwear such as miner's boots and ski boots which have at least one tongue connected at its lower end with an upper of the footwear. The method includes the steps of detachably mounting a pre-formed tongue of the footwear to an auxiliary tongue. The auxiliary tongue is subsequently attached to a last which is inserted into a mold for subsequent molding operations to be carried out.

---

BACKGROUND OF THE INVENTION

This invention relates to a method of and an apparatus for producing footwear, especially miner's or ski boots having at least one tongue connected at its lower end and preferably at its side edges with the uppers of the footwear. The invention also relates to footwear produced by this method and apparatus.

Footwear with one or several tongues is generally known. This footwear is produced in several operations, partly mechanically, partly manually.

SUMMARY OF THE INVENTION

It is the object of the present invention to provide a method and an apparatus for carrying out this method, which will permit to produce footwear with at least one tongue connected at its lower end and preferably at its side edges with the uppers of the footwear and to make such footwear of vulcanized rubber or of plastic in a simple and economical manner by pressure casting or injection molding.

A further object of the invention is to produce footwear which is completely watertight, durable and comfortable to wear.

The method proposed by the invention consists in that for producing footwear of vulcanized rubber or plastic in a mold, the tongue of the footwear is connected with the uppers thereof simultaneously with the production of the footwear in a single operation by interposing an auxiliary tongue between the tongue and the uppers of the footwear, said auxiliary tongue consisting of a material not firmly connectable with the material of the uppers and of the tongue of the footwear.

The aforementioned features of the method proposed by the invention permit for the first time the mechanical production of footwear, with at least one tongue being connected at its lower end and preferably at its side edges with the uppers of the footwear, of vulcanized rubber or plastic by pressure casting or injection molding in a single operation. This permits the known advantages of pressure casting and injection molding to be utilized also for the rapid, inexpensive, easy and secure production of satisfactory, i.e. good and faultless, footwear provided with at least one tongue.

A further advantage of the invention consists in that it permits the production of absolutely watertight footwear with the further advantage that an undesirable sticking of the tongue to the uppers of the footwear is avoided so that the footwear can be easily and readily put on and taken off also in the case of boots, especially miners' and ski boots.

The method permits the production of footwear having one or several tongues which are connected at their lower end with the uppers of the footwear and, if desired, may also be connected at their side edges with the uppers of the footwear.

An advantageous form of realization of the aforementioned method of the invention consists in that the auxiliary tongue is first inserted in the tongue of the footwear and detachably connected therewith, then secured to a last, whereupon a lining, if any, connected with the tongues of the footwear is pulled over the last and subsequently, in the case of pressure casting after previous arrangement of rubber plates around the last, the last is inserted in the mold. According to a further proposal of the invention, it will be advantageous in this realization if the tongue of the footwear is tied over the auxiliary tongue by threads which are sheared off when the mold is closed.

These features permit the method to be carried out in a particularly simple and rapid manner since the tongue of the footwear first is detachably connected with the auxiliary tongue independently of the last. Only after the auxiliary tongue has been connected with the tongue of the footwear, the auxiliary tongue is connected with the last. Owing to the fact that the threads by which the tongue of the footwear is tied over the auxiliary tongue are sheared off when the mold is closed, the additional operation of loosening the threads, which otherwise would be necessary, is dispensed with in the subsequent operation of removing the last.

The invention also relates to a method of producing footwear, preferably ski boots, having inner uppers and outer uppers connected with the inner uppers near the sole. Such footwear was hitherto manually produced in a large number of individual operations. It is therefore an object of the present invention to provide a method by which it is possible to produce the aforementioned footwear in a single operation by pressure casting or injection molding. This part of the invention consist in that for producing such footwear of vulcanized rubber or plastic in a mold, the inner uppers and the outer uppers are connected and produced with the sole in a single operation by interposing a partition wall consisting of a material not firmly connectable with the material of the boot. The footwear so produced may be formed without a tongue, but it may also be provided with one or more tongues for the individual uppers. The outer uppers may, for example, have two tongues, one in front and the other at the back, whereas the inner uppers have only one tongue in front, as is the case in heavy duty special ski boots. The tongues are connected with the uppers at their lower end and, if desired, also at their side edges. When footwear with tongues is to be produced according to the aforementioned method, not only this method is adopted, which uses a partition wall for separating the inner and outer uppers, but also the method of the invention mentioned at the outset, which uses an auxiliary tongue for the individual tongues of the footwear.

By the use of the partition wall, the method permits the production of very complicated footwear of vulcanized rubber or plastic by pressure casting or injection molding, which footwear is provided with inner and outer uppers with or without tongues. In this manner, the advantages of these known methods can also be utilized for the production of such top-quality footwear as hitherto had to be made by hand. The footwear produced by this method is absolutely watertight, undesired sticking or adhering together of the inner and outer uppers, which would make the footwear useless, is reliably avoided. The same applies for the tongues, if any. Undesired sticking together of the tongues and the uppers cannot occur.

A further part of the invention relates to the special design of the apparatus for carrying out the two methods of the invention. This apparatus consists in a known manner of a last and a mold with two side jaws and a bottom die.

The apparatus for carrying out the method of producing footwear with tongues according to the invention comprises an auxiliary tongue adapted to be pivotally connected with the last so as to be easily detachable. The advantages of this construction of the apparatus consist in that they permit the method to be carried out in a rapid and simple manner. A plurality of auxiliary tongues may be used with one mold. The tongue of the boot is fitted to the individual auxiliary tongues outside the mold to ensure rapid working. When removing the last, the auxiliary tongues initially remain on the last. The detachable pivotal connection of the auxiliary tongue with the last may either be established by means of a pivot or advantageously also by means of a magnet arranged on the last.

In a further development of the aforementioned apparatus it is proposed according to the invention to firmly insert a bolt in the one side jaw of the mold to engage the other side jaw for locking the auxiliary tongue when the mold is closed. This will insure that the auxiliary tongue is automatically and reliably brought into its proper position when the mold is being closed. In conjunction with a further proposal of the invention, according to which the auxiliary tongue is provided with slots for receiving threads for tying the tongue of the boot thereover, it is ensured that the tongue of the boot is always brought into its proper position relative to the last and thus relative to the uppers once the apparatus has been adjusted.

A further proposal of the invention aims at rendering the apparatus particularly suitable for producing heavy durable footwear such as miners' boots. According to this proposal the bottom die may be provided with magnets for holding steel inserts which are incorporated in the heel or in the sole of the boot by vulcanizing or injection molding simultaneously with the production of the footwear in one operation. The provision of magnets for holding the steel inserts permits the bottom die to be given a very simple construction and permits simple and rapid operation.

The apparatus for carrying out the method of producing footwear with inner and outer uppers interconnected near the sole and with or without a tongue, may likewise consist in a known manner of a last and a mold with two side jaws and a bottom die. According to the invention, this apparatus may comprise a peripherally extending partition wall engaging between the inner and outer uppers and adapted to be easily detachably connected with the last. According to a further proposal of the invention, this partition wall may be divided and adapted to be pivotally connected with the last. This apparatus permits the production of footwear, which is provided with inner and outer uppers interconnected near the sole, of vulcanized rubber or plastic in a mold. By the special design of the apparatus, the method can be carried out rapidly, securely and economically since a plurality of partition walls may be associated with one mold and one last. Each of the partition walls, after having been prepared, will be pivotally connected with the last and inserted in the mold so that continuous operation is ensured.

The invention also relates to footwear having tongues produced by the two methods of the invention. This footwear comprises uppers, a lining and a textile tongue provided with a layer of rubber and connected at its lower end and at its side edges with the lining and similarly with the uppers. The advantage of this footwear consists in that it is aboslutely watertight since also the side edges of the tongue of the footwear are completely sealingly connected with the lining and with the uppers.

According to a further feature of the invention, such footwear may be provided with eyelet strips and with material reinforcements at the lower ends of the eyelet strips at the junction between the eyelet strips and the vamp upper. This affords the advantage that the footwear will not tear in its particularly critical places and thus will be sturdy and durable.

The aforementioned features are very suitable to permit the production of footwear for heavy duty, such as miners' boots. The following further features of the invention primarily serve for the advantageous design of ski boots. These features relate to footwear with inner and outer uppers interconnected near the sole as is especially the case in expensive top-quality ski boots. As far as this type of footwear is produced with tongues, as is common in ski boots, also the aforementioned features of footwear with tongues can be advantageously used. The special feature of the invention for footwear with inner and outer uppers is seen to reside in that the inner uppers consist of leather, whereas the outer uppers consist of rubber. This will ensure complete watertightness as well as comfort in wearing, since the foot will be in contact with uppers of leather. According to a further proposal of the invention, it is of advantage to provide a lining of felt for the inner uppers, since such a lining will absorb moisture and also provide an efficient heat insulation. According to another proposal of the invention a further advantage may be obtained if the outer uppers are provided with a textile lining. By this measure it is intended to reinforce the outer uppers which are made of rubber.

BRIEF DESCRIPTION OF DRAWINGS

Several exemplified embodiments of the invention will now be described by way of example and with reference to the accompanying drawings, in which.

DESCRIPTION OF SPECIFIC EMBODIMENT

Figure 1:
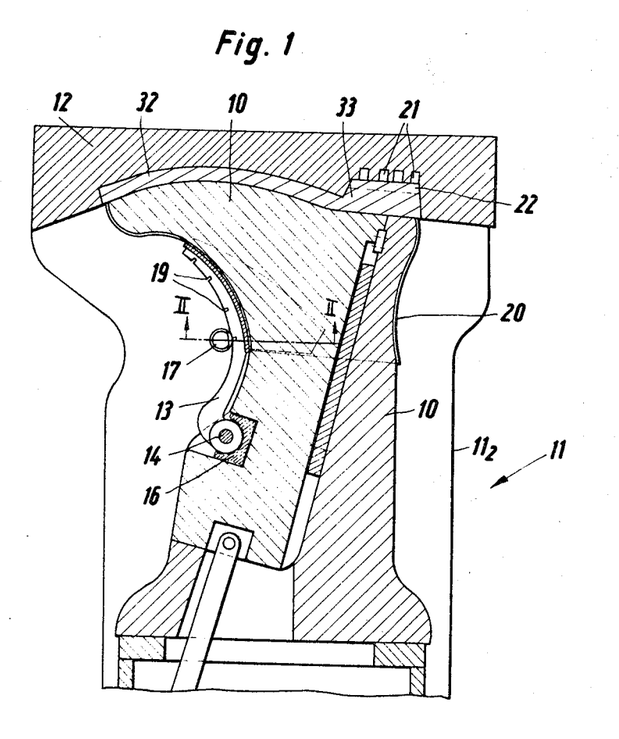
FIG. 1 is a schematic sectional side elevation of an apparatus for carrying out a method of producing footwear as proposed by the invention, the apparatus comprising a last, a mold with two side jaws and a bottom die.

FIG. 1 shows an apparatus for producing footwear, preferably miners' boots, having uppers and a tongue connected with the uppers and its end and preferably also at its side edges. The essential parts of the apparatus are a last 10, a split mold 11 with two side jaws 11₁ and 11₂ (see FIGS. 2, 7 and 8), and a bottom die 12 which can be brought into engagement with the mold 11. The last 10 is expediently divided in a manner known per se, as schematically illustrated in the drawings.

An auxiliary tongue 13 is pivotally connected with the last 10 and can be easily detached therefrom. The pivotal connection can be established in a simple manner with the aid of a pivot 14, shown in FIG. 5, which is provided with a handle 15. The shape of the auxiliary tongue 13 can be seen from FIGS. 2, 3 and 4. The auxiliary tongue 13 can be pivoted to the last 10 by means of a magnet 16 instead of the pivot 14. The magnet 16 shown in FIG. 1 in dash-and-dot lines has approximately the form of a semicylinder. This magnet 16 permits the auxiliary tongue 13 to be pivotally connected with the last 10.

Figures 2, 5:
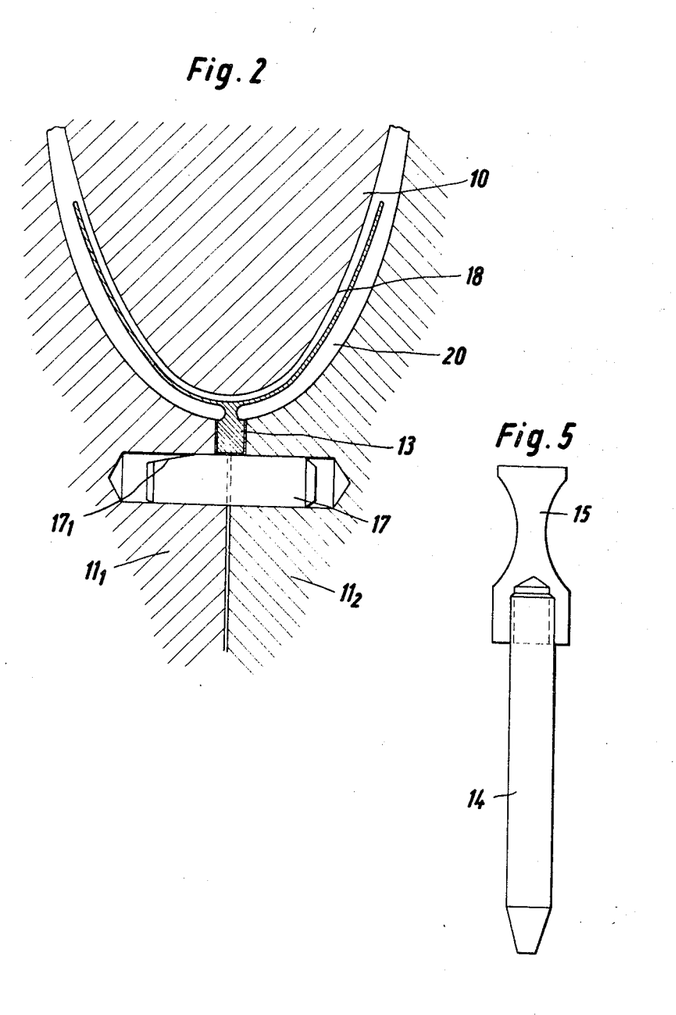
FIG. 2 is a section, on a larger scale, taken on the line II—II of FIG. 1.
FIG. 5 is an elevational view of a pivot for the connection of the auxiliary tongue with the last.
Figures 3, 4:
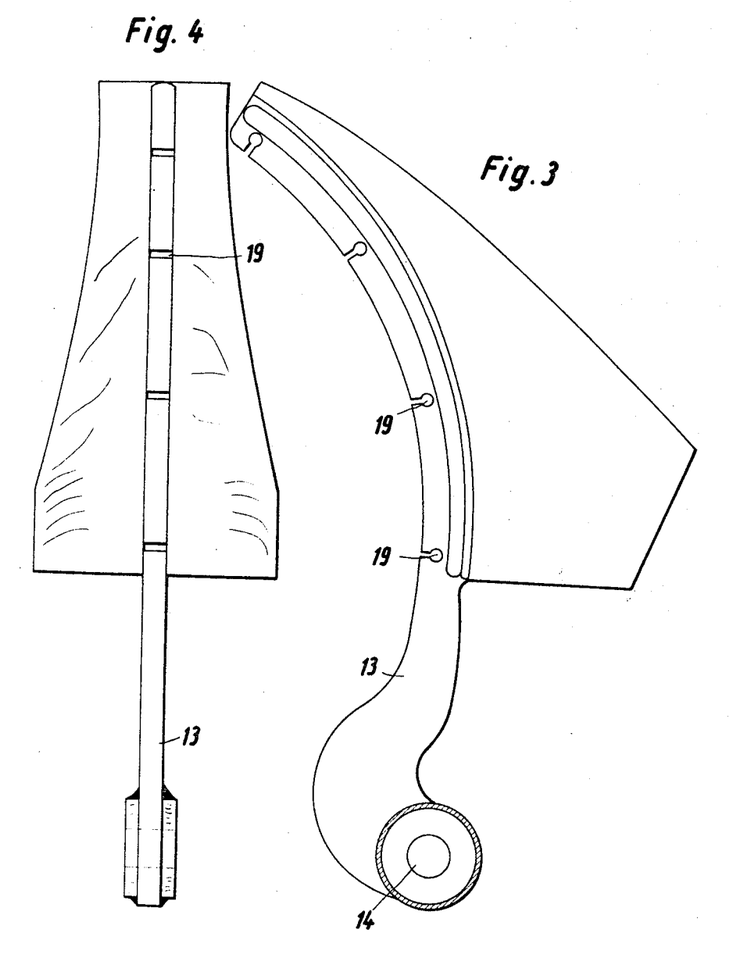
FIG. 3 is a side elevational view of an auxiliary tongue.
FIG. 4 is an elevational view of the same auxiliary tongue, as seen from the left in FIG. 3.

A bolt 17 for locking the auxiliary tongue 13 is firmly inserted in the side jaw 11₂ of the mold 11 and engages in the other side jaw 11₁ when the mold 11 is closed and locks the auxiliary jaw 13, as can be seen from FIG. 2. The locking bolt 17 is provided with an inclined guide surface 17₁ for the auxiliary tongue 13.

The mold shown in FIG. 1 is provided with the last 10 and constitutes a press mold for vulcanizing rubber footwear. When the footwear is to be made of plastic by injection molding, a known mold having injection channels and of a construction very similar to a pressure casting mold is used in conjunction with a known injection molding unit (not shown).

The method of producing heavy-duty footwear and especially miners' boots having at least one tongue connected with the uppers at its end and preferably also at its side edges, as proposed by the invention, is carried out by the aforedescribed apparatus as follows:

For producing a miners' boot of vulcanized rubber, first a pre-formed tongue 18 to be attached to the boot is secured to the auxiliary tongue 13 which is still separate from the last 10, for example by means of threads on the tongue 18. The threads can be tied together over slots 19 in the auxiliary tongue 13. It is also possible to pin the tongue 18 together over the auxiliary tongue 13 by means of clips or clamps. The tongue 18 may advantageously be provided with a lining along its edges. After the tongue 18 has been secured to the auxiliary tongue 13, the latter is pivotally connected with the last 10 by means of the pivot 14 or the magnet 16. In case the tongue 18 is provided with a lining, this is then pulled over the last 10 and a tacking fold on the lining is tied together over the bottom of the last, e.g. as used by the binding method. Then the rubber plates required for the vulcanization of the footwear are placed around the last and upon the bottom thereof and the last thus prepared is inserted in the mold 11. The two side jaws 11₁ and 11₂ are closed and the threads by means of which the tongue 18 is tied together over the auxiliary tongue 13, are sheared off by the closing action of the mold 11. While the side jaws 11₁ and 11₂ are being closed, the auxiliary tongue 13 is brought into the vulcanizing position and secured therein by means of the locking bolt 17. Then the vulcanization is carried out. After the vulcanization of the rubber is completed, the mold 11 is opened and the last 10 is removed. The split design of the last 10 facilitates the removal of the vulcanized footwear. The auxiliary tongue 13 remains on the last 10 since the threads by which the tongue 18 had been tied together over the auxiliary tongue 13 were sheared off when the mold was closed.

The auxiliary tongue 13 consists of a material which is not susceptible of being firmly connected with uppers 20 of the footwear during vulcanization. Thus, there will also be no connection between the auxiliary tongue 13 and the tongue 18. A connection between the tongue 18 and the uppers 20 during vulcanizing is prevented by the auxiliary tongue 13. In this manner it is insured that the produced footwear is absolutely watertight and also the tongue 18 is free to move as required to insure easy putting on and taking off of the footwear. In the interest of clarity, the tongue 18 and the upper 20 have been omitted in FIGURES 2, 6, 7, and 8 although the numerals for the same have been retained therein to indicate the area normally occupied thereby.

To be able to produce heavy, lasting and watertight footwear, magnets 21, for example bar magnets, are further provided in the bottom die 12. These magnets 21 serve for holding one or more steel inserts 22 which are incorporated in a heel 33 or a sole 32 of the footwear by vulcanizing or injection molding in a single operation simultaneously with the production of the footwear.

An apparatus for carrying out a method of producing footwear in which inner uppers and outer uppers are interconnected near the sole, as is especially the case with ski boots, will now be described with reference to FIGS. 6 to 8. This apparatus likewise substantially consists of a last 10, a mold 11 with two side jaws 11₁ and 11₂, as well as a bottom die 12. Between inner uppers 23 and outer uppers 24, there is provided according to the invention a partition wall 25 which can be pivotally connected with the last 10 by means of a pivot 14 so as to be easily detachable. For carrying out the method more easily the partition wall 25 is divided twice at 26.

Figure 6:
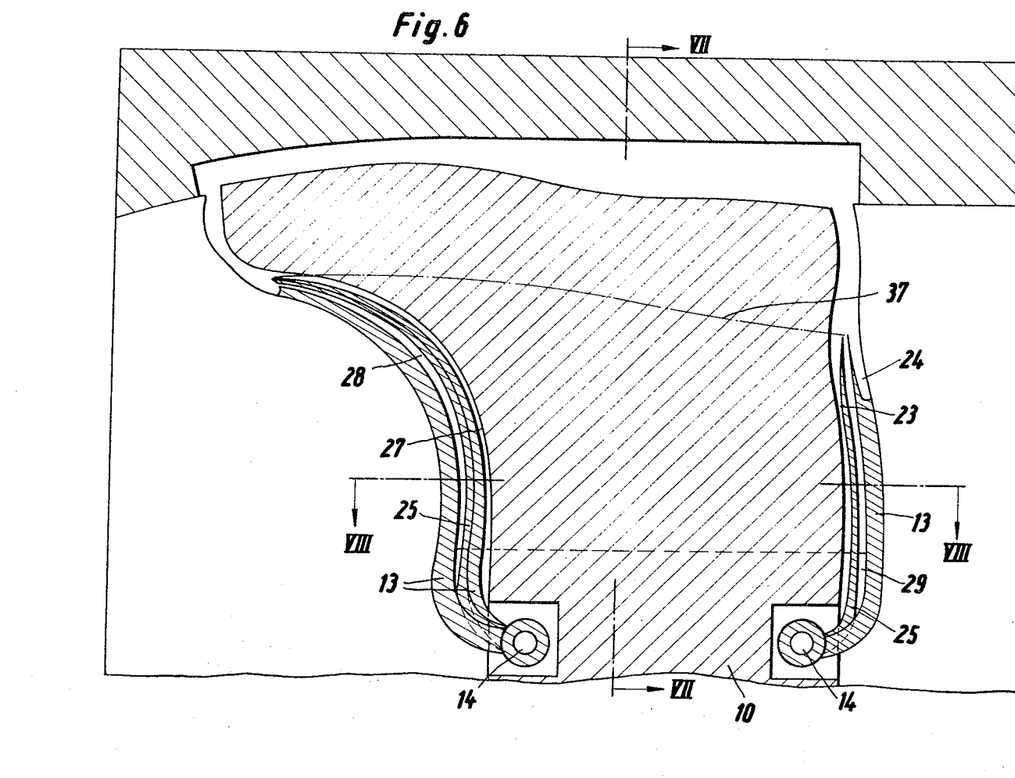
FIG. 6 is a section taken on the line VI—VI of FIG. 7 and showing a modified version of the apparatus for carrying out the method of producing footwear, by which version inner uppers and outer uppers can be interconnected near a sole, such footwear being provided with two front tongues and a rear tongue.
Figure 7:
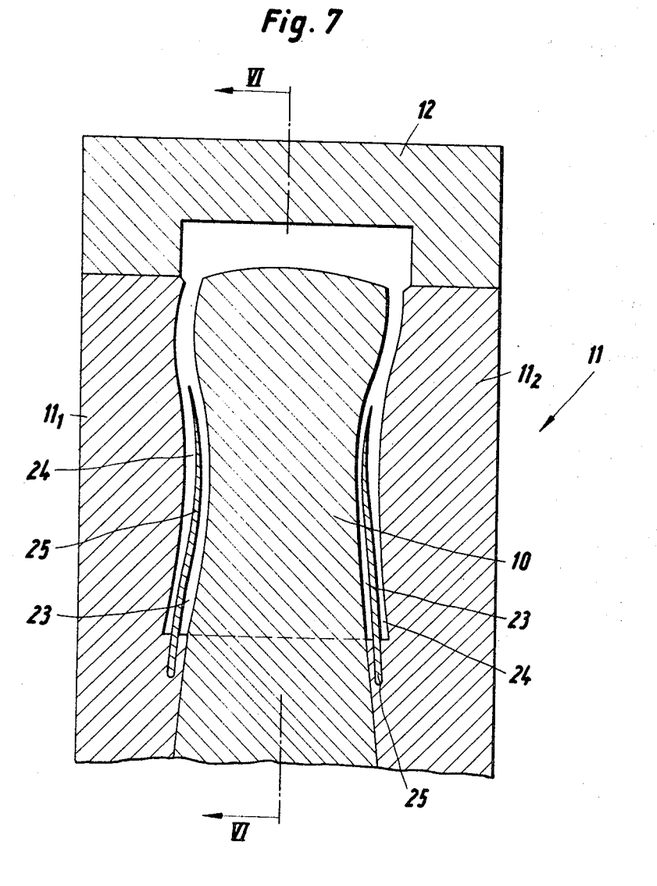
FIG. 7 is a section taken on the line VII—VII of FIG. 6.
Figure 8:
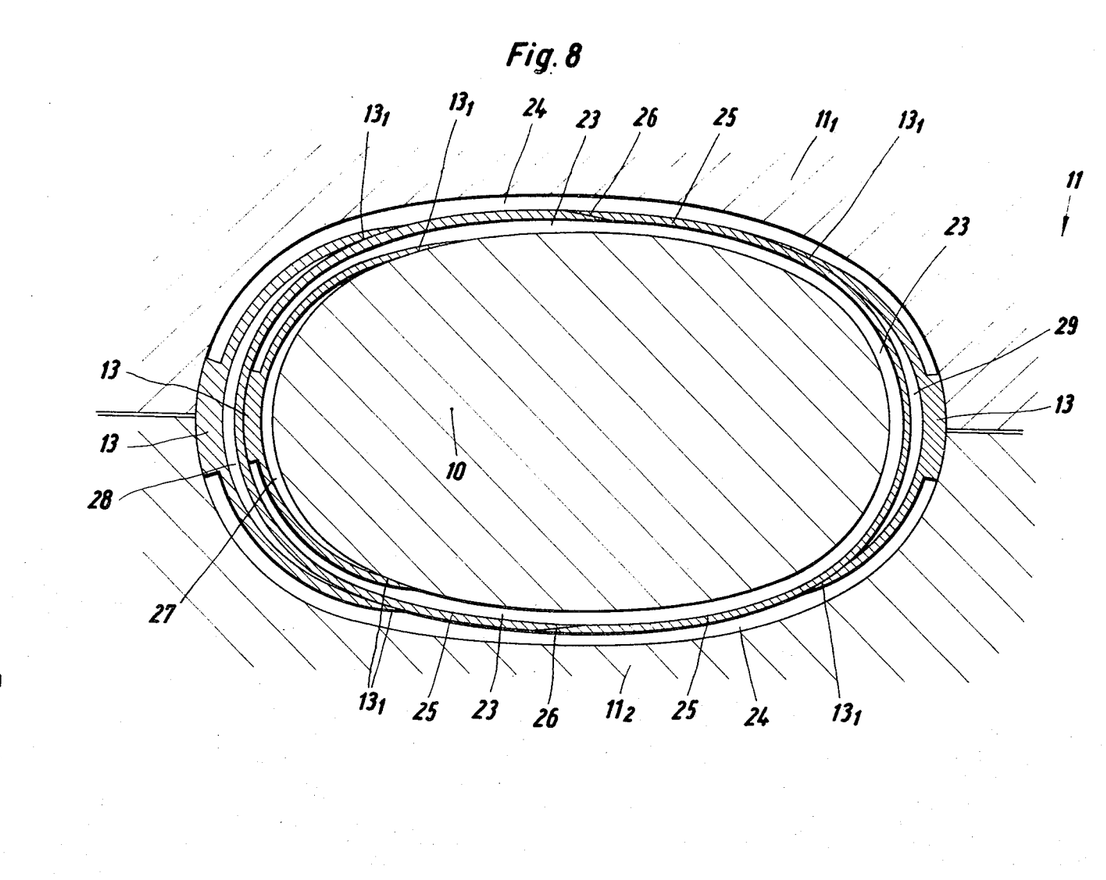
FIG. 8 is a section taken on the line VIII—VIII of FIG. 6.

It will be apparent from FIGS. 6 to 8 that the ski boot to be produced is provided with two front and a rear tongue, in fact the ski boot will have an inner front tongue 27, an outer front tongue 28 and a rear tongue 29. Only the inner ends of all three tongues are connected with the inner uppers 23 and the outer uppers 24. The side edges of the tongues are not connected with the uppers. To be able to produce the tongues of vulcanized rubber or plastic in a single operation in a press or die casting mold, an auxiliary tongue 13 is provided for each of the tongues 27, 28 and 29, as shown in FIG. 8. If also the side edges of the tongues 27, 28 and 29 are to be connected with the uppers 23 and 24, the auxiliary tongues 13 are given a form somewhat different from that shown in FIG. 8 by bending their free ends 13 somewhat more outwardly so that they will not engage the last 10 or the partition wall 25 but terminate freely within the material of the inner uppers 23 or the outer uppers 24. The ski boot produced by the apparatus shown in FIGS. 6 to 8 uses boot strings in front and at the back, as is usually the case with expensive ski boots.

For producing the ski boot according to FIGS. 6 to 8, first the tongues 27, 28 and 29 are pulled over the auxiliary tongues 13 as in the description of the embodiment of FIG. 1, then the tongues 27, 28 and 29 are detachably tied around the auxiliary tongues 13 or they are inserted in the curvature of the auxiliary tongues and connected there, for example, by using an adhesive. Then the auxiliary tongue 13 with the inner front tongue 27 is pivotally connected with the last 10 and the rubber plates for the inner uppers 23 are placed around the last 10. Subsequently, the partition wall 25 is placed around the last 10 so prepared, and pivotally connected therewith similarly to the auxiliary tongues. Subsequently, the auxiliary tongues 13 with the outer front tongues 28 and the rear tongue 29 are pivotally connected with the last 10 and after that the rubber plates for the outer uppers 24 are applied. The last 10 so prepared is then inserted in the mold 11 and after closing the mold, vulcanization is carried out. To facilitate removal of the ski boot from the last 10, the latter may be split as shown in FIG. 1.

It is also possible to make the inner uppers 23 of leather and the outer uppers 24 of rubber. Further, the inner and outer uppers may be provided with a lining, for example of linen. Advantageously, felt may be used as a lining for the inner uppers and textiles such as linen for the outer uppers.

The partition wall 25 as well as the auxiliary tongues 13 consist of a material which is not firmly connectable with the uppers. Metal has been found to be particularly suitable for this purpose. But other materials might also be used.

Figure 9:
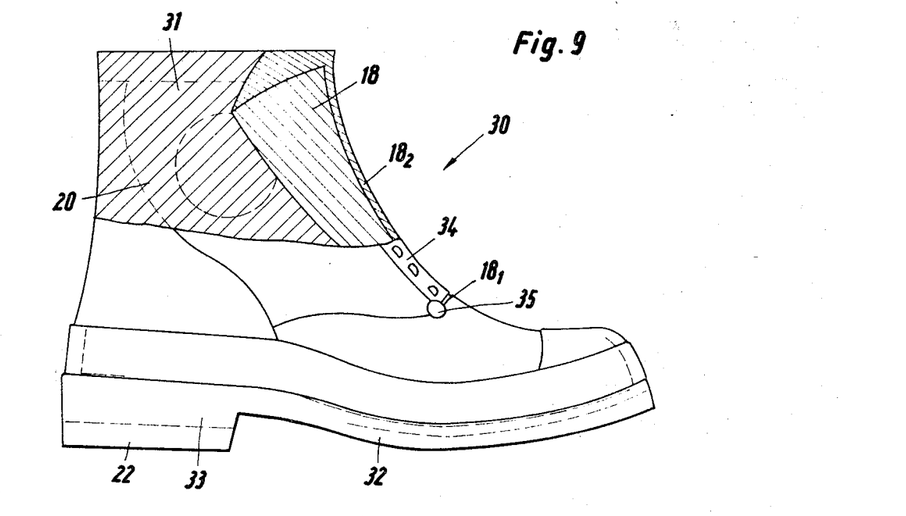
FIG. 9 is a side elevational view, partly in section, of a miners' boot.
Figure 10:
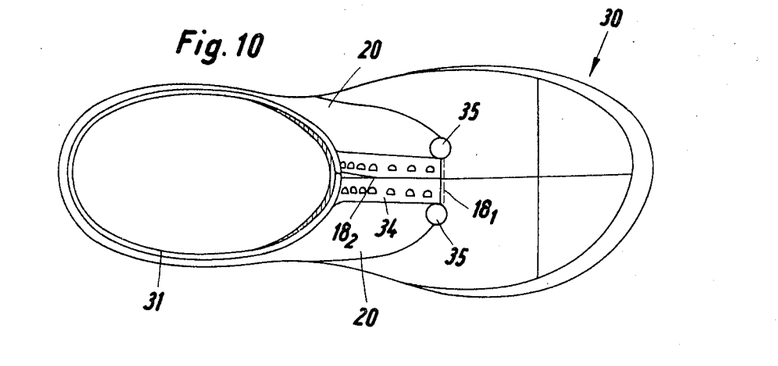
FIG. 10 is a top plan view of FIG. 9.

FIGS. 9 and 10 show a miners' boot 30 having uppers 20 and produced by the method according to the invention. This miners' boot 30 has a tongue 18 consisting of textile material and provided with an outer layer of rubber to make it waterproof. An end $18_1$ and side edges $18_2$ of the tongue 18 are connected with a lining 31 and with the uppers 20. The miners' boot is completely watertight since the uppers 20 and the sole 32 with the heel 33 consist of vulcanized rubber.

At the junction between the vamp upper and eyelet strips 34, the material of the uppers 20 is provided with reinforcements 35, for example in the form of the knubs shown. These knubs prevent the uppers from tearing at these particularly critical places. The heel 33 has a steel insert 22 and the sole 32 might be provided with similar steel inserts, for example at its tip.

Figure 11:
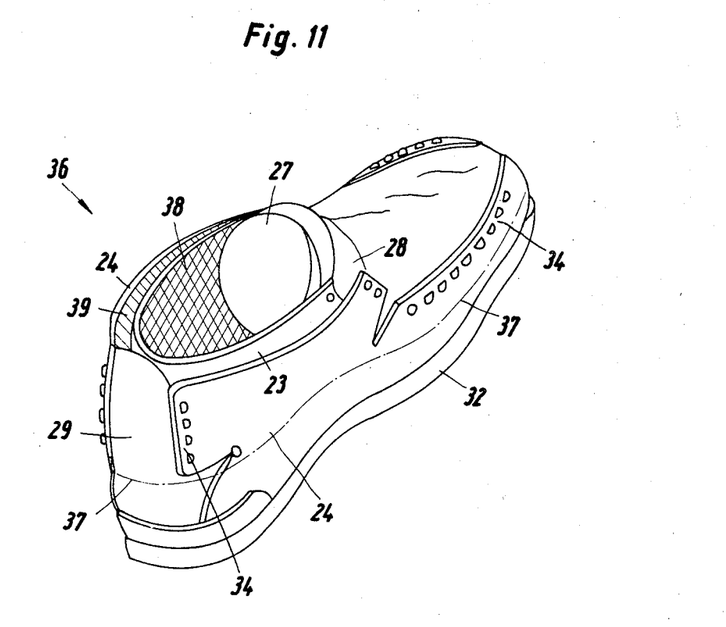
FIG. 11 is a perspective view of a ski boot having inner and outer uppers, two front tongues and a rear tongue.

FIG. 11 shows a ski boot 36 which has been produced, for example, by a mold of the type shown in FIGS. 6 to 8. This ski boot 36 has inner uppers 23 and outer uppers 24. The inner and outer uppers 23 and 24 are interconnected around their adjacent circumferential surfaces in a region extending from the sole 32 upwardly to a dash-and-dot line 37, whereas they are separate from each other above the line 37. The dash-and-dot line 37 is also plotted in FIG. 6. Both the inner and outer uppers of the ski boot may consist of rubber, but preferably the ski boot is of the design shown in FIG. 11 in which the inner uppers 23 are made of leather while the outer uppers 24 consist of rubber. The inner uppers 23 are provided with a felt lining 38 and the outer uppers 24 with a textile lining 39. The inner front tongue 27 is made of leather as are the inner uppers 23, whereas the outer front tongue 28 and the rear tongue 29 consist of rubber. The inner uppers 23 have eyelets only on their fore-part, whereas the outer uppers 24 have eyelets on the fore-part and at the rear. It has also been found to be of great advantage to use a lining of felt with inner uppers of rubber.

The invention may be embodied in other specific forms without departing from the spirit or essential characteristics thereof. The present embodiments are therefore to be considered in all respects as illustrative and not restrictive the scope of the invention being indicated by the appended claims.

I claim:

1. A method of producing footwear such as miner's boots and ski boots which have at least one tongue connected at its lower end with an upper of the footwear comprising the steps of:
   (a) detachably connecting a pre-formed tongue of the footwear to an auxiliary tongue of a last,
   (b) attaching said auxiliary tongue to said last,
   (c) inserting the last into a mold,
   (d) closing the mold, and
   (e) subjecting said mold to a molding operation to form said footwear.

2. A method of producing footwear as defined in claim 1 wherein
   said mold is a press form and
   said molding operation includes the vulcanization of rubber to form rubber footwear.

3. A method of producing footwear as defined in claim 1 wherein
   said mold is an ejection mold and
   said molding operation includes the injection of plastic material to form plastic footwear.

4. A method of producing footwear as defined in claim 1 wherein
   lining material for the footwear is connected to the tongue material before connecting said pre-formed tongue to said auxiliary tongue,
   said lining material being pulled over the last after the auxiliary tongue has been connected to the last.

5. A method of producing footwear as defined in claim 1 wherein
   said auxiliary tongue is pivotally connected to said last.

6. A method of producing footwear as defined in claim 1 wherein
   threads are used to detachably connect the footwear tongue material to the auxiliary tongue,
   said threads being sheared off when the mold is closed.

7. A method of producing footwear as defined in claim 1 wherein
   said footwear has inner uppers and outer uppers connected near the sole, each upper including said pre-formed tongue, and
   the method further including the steps of
   attaching a partition wall means to the last between the auxiliary tongues used for the inner uppers and outer uppers,
   said attaching step being made before placing the last in the mold and subjecting the mold to the molding operation.

References Cited

UNITED STATES PATENTS

| | | |
|---|---|---|
| 1,899,754 | 2/1933 | Glidden et al. |
| 2,654,904 | 10/1953 | L'Hollier. |
| 3,050,874 | 8/1962 | Silombra. |
| 3,166,771 | 1/1965 | Kline et al. _________ 12—123 |

H. HAMPTON HUNTER, *Primary Examiner.*

U.S. Cl. X.R.

12—123, 142; 18—46; 264—263